(12) United States Patent
Bland et al.

(10) Patent No.: US 8,363,808 B1
(45) Date of Patent: Jan. 29, 2013

(54) BEEPING IN POLITELY

(75) Inventors: Michael A. Bland, Boulder, CO (US);
Michael J. Thomas, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 1263 days.

(21) Appl. No.: 11/860,741

(22) Filed: Sep. 25, 2007

(51) Int. Cl.
*H04M 3/42* (2006.01)

(52) U.S. Cl. .................... 379/202.01; 370/261; 709/204; 709/227

(58) Field of Classification Search ............. 379/202.01; 370/261; 709/204, 227
See application file for complete search history.

(56) References Cited

U.S. PATENT DOCUMENTS 5,483,588 A * 1/1996 Eaton et al. ............. 379/202.01
2007/0081647 A1 * 4/2007 Baker ........................ 379/158

OTHER PUBLICATIONS

Saini et al. DERWENT-ACC-No. 1990-211515 Dec. 15, 1988.*

* cited by examiner

*Primary Examiner* — Quynh Nguyen
(74) *Attorney, Agent, or Firm* — Sheridan Ross P.C.

(57) ABSTRACT

The present invention provides methods, devices, and systems for allowing a conference participant to politely join a conference already in progress. The conference participant may attempt to connect to the conference and the conferencing system may wait to allow the participant access to the conference until a polite moment occurs in the conference. Upon such an occurrence of a polite moment, the participant may be joined to the conference and the participant's presence may be announced.

21 Claims, 4 Drawing Sheets

BEEPING IN POLITELY

FIELD OF THE INVENTION

The invention relates generally to communication systems and more particularly to conferencing systems.

BACKGROUND

A conference system can play a beep or provide some other sort of indication when a new person has joined the call. One example of other indications used to indicate that a new person has joined the call is that a recording of the person's name is announced to all other participants. Although the beep or other indication allows the other participants to know when a new person is joining the call it often interrupts the other participants already engaged in the call. One problem with current systems is that the person is allowed to join the call at any time. This means that the beep or other indication is provided to all other participants without any concern for what is actually occurring in the conference call. This may result in the speaker's voice being cut out, the speaker stopping in mid-sentence, or the meeting leader interrupting the speaker to ask, "who joined?" These beeps are similar to someone rudely interrupting a group of people talking in person, without waiting for a break in the conversation.

The problem is exacerbated in large conferences when several people join a call at around, but not exactly at, the same time. In such large meetings, the continual beeping to announce new participants can become very distracting.

Some conferencing systems allow the beep or indication to be completely disabled. This is advantageous in that the other participants are not interrupted during the conference. However, the beep or indication does serve the purpose of letting the participants know that someone has joined the conference. Without the beep or other indication, someone could easily join the conference and eavesdrop.

It would therefore be advantageous to provide a conferencing system that facilitates the polite introduction of participants to the conference.

SUMMARY

These and other needs are addressed by various embodiments and configurations of the present invention. The present invention is directed generally to a system, device, and method for facilitating a polite entry of participants to a conference call. The method generally comprises:

determining that a first new caller desires to join the conference;

analyzing activity of the two or more previously connected participants;

based on the analysis step, determining whether it is polite to allow admittance of the first new caller to the conference call;

if admittance of the first new caller is determined to be polite, allowing the first new caller to join the conference call; and if admittance of the first new caller is determined not to be polite, causing the first new caller to become a first waiting participant to the conference call.

As can be appreciated by one skilled in the art, the conference may initially be between two or more participants who may or may not be on different communication devices. As an example, two participants may be engaged in a conference call on two separate communication devices. As another alternative example, two participants may be engaged in a conference call on a single communication device (i.e., the participants are sharing the communication device).

The admittance of the new caller to the conference call is controlled on the basis of politeness. More specifically, the new caller may be denied admittance to the conference call until a polite moment occurs in the conference call. Polite moments may correspond to any moment in time where the announcement of adding the new caller to the conference call would not interrupt a current participant in the conference call or otherwise disrupt the flow of the conference call. Polite moments may be detected and defined in a number of different ways. For example, participants in the conference call may identify polite moments. Alternatively, polite moments may be automatically detected based on a real-time analysis of the activity in the conference call. By waiting for a polite moment to admit a new caller to the conference call, the conference call can carry on in a more natural fashion as if it were a face-to-face conversation and a new participant only joins the conversation when they sense that a polite moment for interruption has occurred.

In accordance with at least some embodiments of the present invention, a device for facilitating a polite conference call is provided, the device generally comprising a conference analyzer operable to restrict admittance of new callers to a conference call between two or more participants until a polite moment in the conference call is detected.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to politely allow conference participants to join a conference.

The exemplary systems and methods of this invention will also be described in relation to communications software, modules, and associated communication hardware. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communication network and/or the Internet, or within a dedicated secure, unsecured and/or encrypted system. Thus, it should be appreciated that the components of the system can be combined into one or more devices, such as an enterprise server, a PBX, or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof. Similarly, one or more functional portions of the system could be distributed between a server, gateway, PBX, and/or associated communication device.

Figure 1:
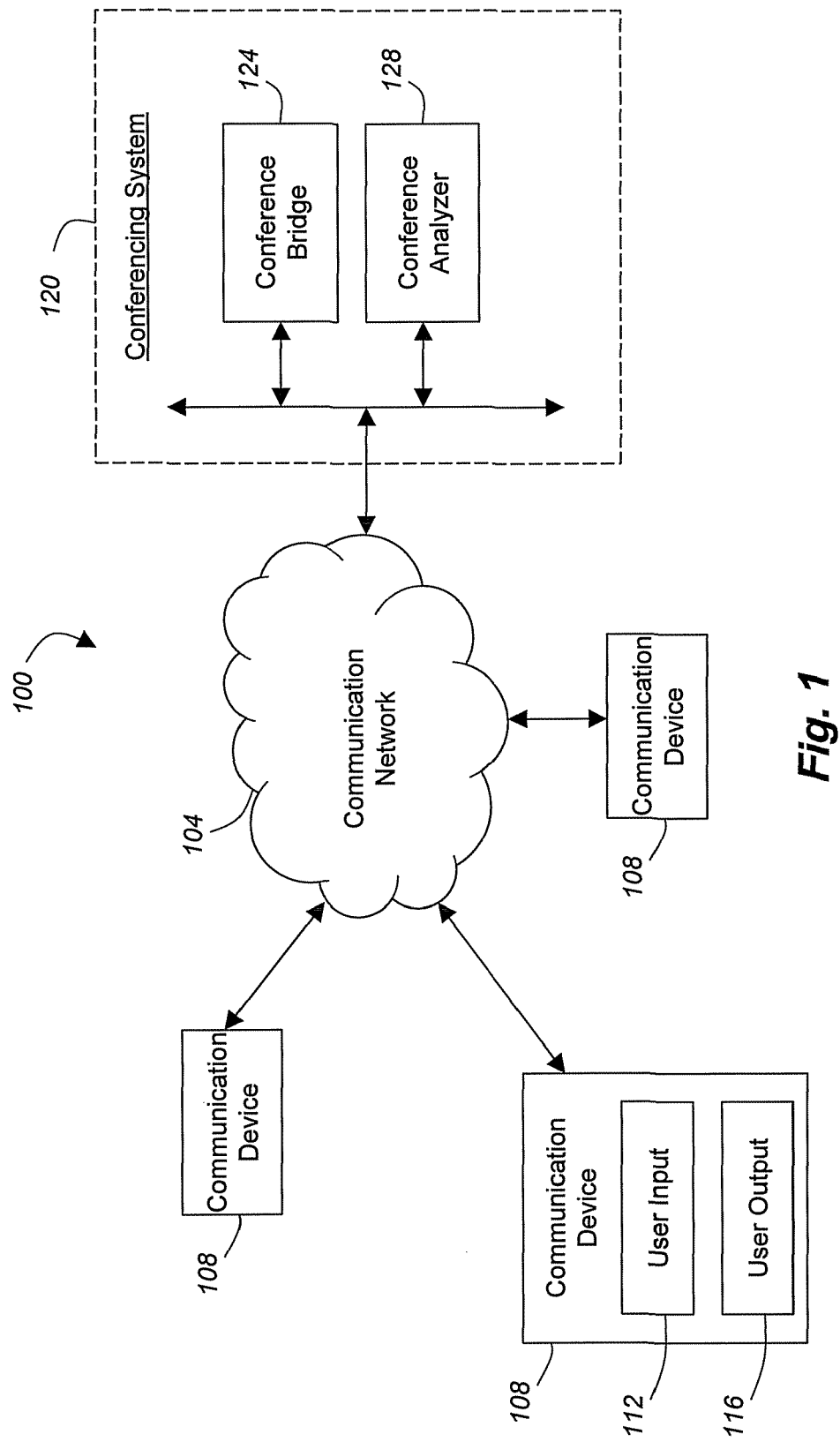
FIG. 1 is a block diagram of a communication system in accordance with embodiments of the present invention.

Referring initially to FIG. 1, a communication system 100 will be described in accordance with at least some embodiments of the present invention. The communication system 100 generally comprises a communication network 104 through which communication signals may be transmitted from a communication device 108 to another communication device 108. Each communication device 108 may be associated with different users. The communication devices 108 may be part of a common enterprise network serviced by a common PBX or call server. Alternatively, the communication devices 108 may belong to different networks.

The communication network 104 may comprise any type of information transportation medium and may use any type of protocols to transport messages between endpoints. The communication network 104 may include wired and/or wireless communication technologies. The Internet is an example of the communication network 104 that constitutes an IP network consisting of many computers and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, and any other type of packet-switched or circuit-switched network known in the art. In addition, it can be appreciated that the communication network 104 need not be limited to any one network type, and instead may be comprised of a number of different networks and/or network types.

The communication devices 108 may comprise any type of traditional communication devices that employ the PSTN for communication. The communication devices 108 may also comprise IP communication devices such as, for example, IP phones, Personal Digital Assistants or PDAs, Personal Computers or PCs, laptops, packet-based H.320 video phones and conferencing units, packet-based voice messaging and response units, packet-based traditional computer telephony adjuncts, conventional wired or wireless telephones, cellular phones, and any other IP device equipped with the tools to facilitate various types of communication like voice, messaging, streaming, and video. In accordance with at least some embodiments of the present invention, the communication devices 108 may be enabled to communicate using SIP standards. Legacy communication devices 108 may communicate with other SIP devices, such as a SIP enabled communication device by utilizing known trunking techniques.

The communication devices 108 may comprise a user input 112 and user output 116. The user input 112 is typically a signal-receiving unit like a voice transducer, microphone, camera, and/or video camera. The user input 112 may also include a touchtone keypad, touch screen, mouse, or other types of user input devices.

The user output 116 is operable to convert the data representing audible sounds into a format intelligible to a user of the communication device 108. The user output 116 may also comprise a visual display as an output device that shows a user information related to other participants on the call. In the event that the user is a participant in a conference call, the user output 116 may display information related to participants already joined in the conference and waiting to join the conference. The user output 116 may be in the form of a speaker, a Liquid Crystal Display (LCD) screen, a set of Light Emitting Diodes (LEDs), a single LED, a Cathode Ray Tube (CRT) display, or other type of mechanism able to articulate information to a user of the communication device 108.

The communication devices 108 are generally operable to generate and transmit audio messages, video messages, and/or data messages (e.g., email, text messages, SMS messages, etc.) across the communication network 104 to other communication devices 108. In accordance with at least some embodiments of the present invention, two or more communication devices 108 may be conferenced together through a conferencing system 120. In accordance with embodiments of the present invention, the conferencing system 120 is remotely located with respect to the communication devices 108 and may be independently operated by a conferencing service. Although depicted as a separate element, one skilled in the art will appreciate that the conferencing system 120 may reside on one or more communication devices 108 or within the same enterprise as a communication device 108. More specifically, a communication device 108 may comprise the necessary processing capabilities to mix together inputs from various other communication devices 108 to facilitate a conference call.

The conferencing system 120 may comprise one or more conference bridges 124 and a conference analyzer 128. When several users of the communication devices 108 wish to conference with each other simultaneously, the conference bridge 124 is typically employed. The conference bridge 124 connects each channel from each endpoint (i.e., communication device 108) participating in the conference call such that every participant of the conference call can hear what any one of the other participants is saying at a given time, assuming that one of the participants has not muted their user input 112. This is accomplished by a number of mechanisms. One such mechanism is the received signals from every endpoint are summed together into a single outgoing signal for each participant. Each participant's received signal is never added to (or subtracted from) the summed signal from the summed signal that a given participant will receive. Specifically, if three parties A, B, and C are joined in a conference call, the signals from parties A and B are summed and sent to party C, the signals from parties A and C are summed and sent to party B, and the signals from parties B and C are summed and sent to party A. This is typically accomplished by having each channel of the conference bridge 124 have its own mixer (summation point).

Another way this is accomplished is that the conference bridge 124 may include software and/or hardware that can determine what parties are speaking and automatically send that signal to all other participants of the conference call. The determination can be made for instance by voice recognition software, channel activity detection, or the like. This requires a little more processing power in the conference bridge 124 and is typically used less frequently for this reason.

The conference analyzer 128 may be a separate element from the conference bridge 124 that is adapted to analyze the activity of participants in the conference to determine when, for example, polite moments occur in the conference. In accordance with at least some embodiments of the present invention, the conference analyzer 128 is used to determine and control when new callers are allowed to join the conference call as a participant. The conference analyzer 128 may be operable to restrict the admittance of a caller to the conference until a polite moment occurs in the conference or after another predetermined event occurs. By restricting admittance of the caller to the conference until a polite moment occurs, the conference analyzer 128 is operable to facilitate a conference call that does not interrupt the other participants during the conference. This means that the introduction and admittance of the caller will more closely mirror what actually happens during face-to-face group conversations.

Although depicted as a separate element, the conference analyzer 128 may also be executed by the conference bridge 124 as a plug-in or similar type of software program. More particularly, instructions associated with the conference analyzer 128 may be stored on the conferencing bridge 124 and executed by its processor.

Figure 2:
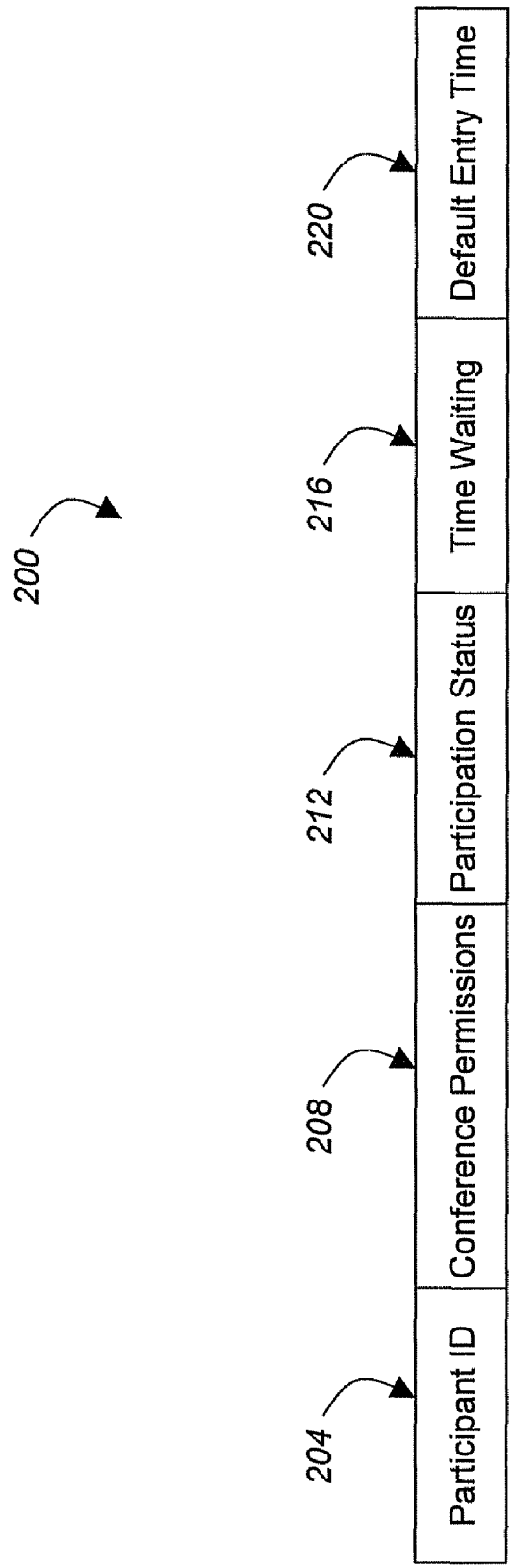
FIG. 2 is a diagram of a data structure employed in accordance with embodiments of the present invention.

With reference now to FIG. 2, a data structure 200 used to facilitate a polite conference will be described in accordance with at least some embodiments of the present invention. The data structure 200 may include a participant ID field, a conference permissions field 208, a participation status field 212, a time waiting field 216, and a default entry time field 220.

The participant ID field 204 may be used to store data related to the user of a particular communication device 108 as well as identification information for the communication device 108. For example, the name and profile information (e.g., employee ID, participant username, etc.) for the user may be maintained in the participant ID field 204. Identification information for the communication device 108 that may be maintained in the participant ID field 204 may include phone number, port number, extension, IP address, Address of Record (AOR), or any other type of indicia used to contact the communication device 108.

Information maintained in the conference permissions field 208 may include indications of the participant's role or permissions for the particular conference call. For example, if the participant is a host of the conference call, then such information may be maintained in the permissions field 208. Furthermore, the actions that the participant is allowed to engage in (e.g., host permissions such as allow other callers to enter the conference or restrict their entry) may be provided in the conference permissions field 208. Conversely, if the participant is not a host and therefore does not have host rights to the conference, then such information may be maintained in the permissions field 208.

The participation status field 212 may maintain information related to whether or not a particular user is connected to a conference (i.e., an active participant), is waiting to be connected to a conference (i.e., a waiting participant), or has not yet reported to the conference. The information in the participation status field 212 may be updated as callers continue to join and leave a conference. Accordingly, the participation status field 212 may be updated continually, periodically, or on an event basis.

The time waiting field 216 may comprise a clock or counter that indicates the amount of time that a waiting participant has been waiting to connect to the conference. The clock may count up from zero or count down from a predetermined value. The information in the time waiting field 216 may be compared to information maintained in the default entry time field 220. The value in the default entry time field may vary based on whether the clock in the time waiting field 216 is counting up or counting down. If the clock is counting up, then the default entry time may comprise a predetermined value that represents a threshold wait time value. If the value in the time waiting field 216 meets or exceeds the value in the default entry time field 220, then the waiting participant may be admitted to the conference even if a polite moment has not occurred. On the other hand, if the clock is counting down, then the default entry time may comprise a value of zero that represents a threshold wait time value. If the value in the time waiting field 216 falls below the value in the default entry time field 220, then the waiting participant may be allowed a forced admittance to the conference. The values in the default entry time fields 220 may be the same for all participants and may be predefined based on user (i.e., the host's) preferences. In an alternative embodiment, the values in the default entry time 220 may vary by participant. As an example, the default entry time 220 value for each participant may be based on the participant's conference permissions. More specifically, a conference host may be allowed to have a lower default entry time (e.g., if the clock in the time waiting field 216 is counting up) as compared to other non-host participants.

Figure 3:
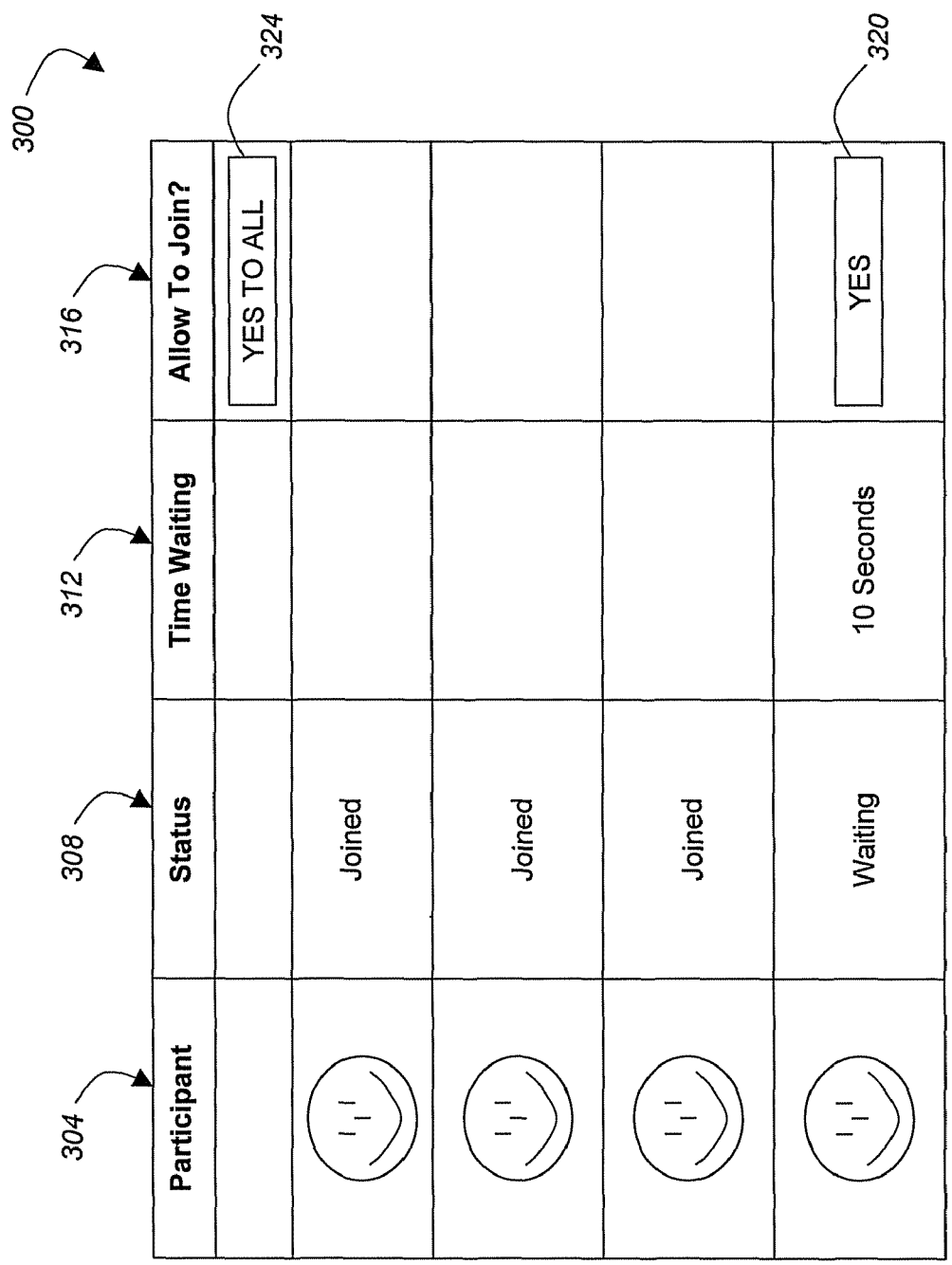
FIG. 3 is a diagram depicting a display on a conference participant's communication device showing participants in and waiting to join a conference in accordance with embodiments of the present invention.

FIG. 3 depicts an exemplary user display 300 that may be provided to one or more conference participants in accordance with at least some embodiments of the present invention. The user display 300 may be shown to a user of a communication device 108 via the user output 116. The user display 300 may be shown to all conference participants. Alternatively, certain portions of the display 300 may only be shown to the conference host. The user display 300 may comprise a number of fields similar to the data structure 200. More particularly, the user display 300 may comprise a participant field 304, a status field 308, a time waiting field 312, and an allow to join field 316.

The participant field 304 may be populated based on information in the participant ID field 204 and/or conference permissions field 208. In accordance with at least some embodiments of the present invention, each participant may be associated with a particular icon or image which can be displayed in the participant field 304 along with the participant's name. Conversely, a generic image or icon may be presented in the participant field 304 along with the participant's name.

The status field 308 may be populated with information from the participant status field 212 of the data structure 200. Examples of displays that may be provided in the status field 308 include joined, waiting, and/or not joined.

The time waiting field 312 may be populated with information from the time waiting field 216 of the data structure 200. Alternatively, the time waiting field 312 may show the difference between values in the time waiting field 216 and the default entry time field 220 of the data structure 200. In such an embodiment, the time waiting field 312 will progressively count down until a default time is reached.

The allow to join field 316 may include user selectable icons or buttons 320, 324 that can be engaged to allow one or all waiting participants to join the conference. This particular field and the icons/buttons 320, 324 therein may only be presented to the host participant if the host participant desires to maintain control of the forced admittance of participants. Alternatively, the allow to join field 316 may be selectively displayed to one or more users if that particular user is speaking. For example, if a first user is speaking that user may be presented with the option to allow admittance of other participants while the participant is talking. The other non-speaking participants may not be provided with this option. Once the first participant stops talking, however, the option to allow waiting participants into the conference may be revoked and the allow to join field 316 may disappear from the first participant's display.

A participant presented with the option to force admittance may select the yes icon/button 320 to selectively allow a waiting participant to enter the conference. The yes to all icon/button 324 may be used to allow all waiting participants to join the conference. Typically speaking, however, if one participant is allowed to join the conference, it would be desirable to allow admittance to all other waiting participants. This way a single notification can be provided indicating that many participants have joined instead of forcing each participant to join at different times. By admitting waiting participants in groups the number and frequency of interruptions can be decreased. Once a participant's status 212, 308 has changed from waiting to joined, the admittance icon/button 320 may disappear for that particular participant.

Figure 4:
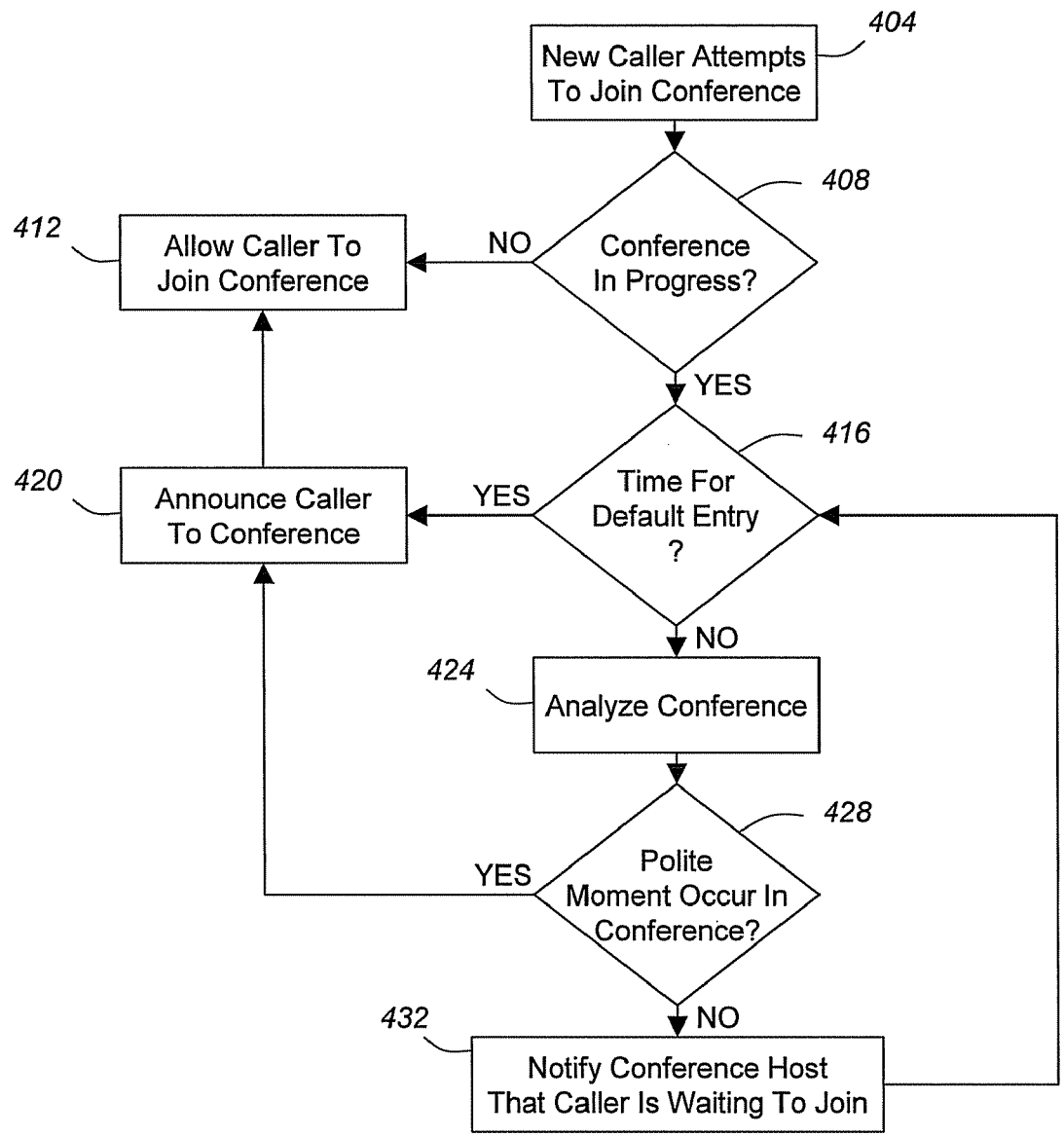
FIG. 4 is a flow diagram depicting a method of facilitating a polite conference in accordance with embodiments of the present invention.

With reference now to FIG. 4, a method of facilitating a polite conference will be described in accordance with at least some embodiments of the present invention. The method is initiated when a new caller attempts to join the conference (step 404). The caller may attempt to join a voice and/or video conference by dialing or otherwise connecting to the conferencing system 120. In accordance with some embodiments of the present invention, the caller may call in to the conference system 120 and then provide a password or conference ID number to specify which conference within the conference bridge 124 that the caller wishes to connect with.

Upon determining which conference the caller wishes to connect with, the conference analyzer 128 determines whether the conference is already in progress (step 408). This determination may be made by comparing the current time (i.e., the time that the caller connected with the conferencing system 120) with the time that the conference is scheduled to start (i.e., either the actual scheduled conference start time or the time that the conference bridge 124 was opened to allow conference participants to call in). If the conference start time has not yet been reached or if the conference has not started for some other reason (e.g., because the host participant has decided to delay the start of the conference), then the caller is allowed to join the conference and become an active participant (step 412). Although not depicted in this manner, one skilled in the art will appreciate that the addition of the new caller to the conference may also be announced to all other participants connected to the conference, even if the conference has not yet officially begun.

Some conference systems will not consider the conference to be in progress until the host has joined. Typically everyone is queued until the host joins to start the conference. For this queued period, the default time for polite entry may not be applicable, and all waiting participants can be joined automatically when the host joins.

However, if the conference is already in progress, then the method continues with the conference analyzer 128 determining if the waiting participant (i.e., the caller attempting to join the conference) should be allowed a default or hard entry into the conference (step 416). As used herein, a default or hard entry may also be considered a polite moment since the waiting participant is allowed hard entry only by the settings defined by or wishes of the conference participants.

The conference analyzer 128 may affirmatively make such a determination if the waiting participant has been waiting for longer than a prescribed default entry time. Additionally, the conference analyzer 128 may affirmatively make such a determination if the waiting participant comprises conference permissions that allow the participant immediate access to the conference upon connecting with the conference system 120 (e.g., if the waiting participant is a host). Still other default or hard entries may be forced by the host or other active conference participants (e.g., a speaking participant) if the active participant selects a button/icon 320, 324 thereby admitting the waiting participant to the conference. If for any reason the waiting participant is allowed default or a hard entry in to the conference, then an announcement is made to the other active conference participants that the new caller has joined the conference (step 420). This announcement may be in the form of a beep, a tone, or some other slight audio indicator. Alternatively, the announcement may comprise playing a recording of the caller saying their name or the like. After the caller has been announced to the other active conference participants, the method continues to step 412 where the caller is allowed to join the conference (i.e., speak and be heard by the active conference participants as well as listen to other active conference participants speak).

If, on the other hand, the waiting participant is not allowed default admittance to the conference, then the method continues with the conference analyzer 128 analyzing the conference and the interaction between the various active conference participants (step 424). In accordance with at least some embodiments of the present invention, the conference analyzer 128 may analyze the speech activity of the active participants by determining if speech signals are being received over any channel connecting the active participant to the conference bridge 124. The conference analyzer 128 may also be adapted to determine if breaks in speech activity are due to an actual pause in the conversation or if a speaker is gathering their breath or pausing for some other reason. This determination may be based on the length of the pause as well as the language being spoken. The conference analyzer 128 may also be adapted to analyze the inflections of a speakers voice to determine if they are asking a question or ending a sentence. The conference analyzer 128 may also be adapted to listen for key words that may indicate a polite moment is about to occur.

As the conference analyzer 128 analyzes the conference activity, the conference analyzer 128 determines if a polite moment has occurred in the conference (step 428). Polite moments may be defined as a moment in time that would be long enough to announce the admittance of another waiting participant to the other active participants without interrupting any speaking participant or otherwise disrupting the flow of the conference conversation. A polite moment may be detected if the participants are inactive (e.g., not speaking or sending any other types of messages) for a predetermined amount of time. As noted above, the threshold amount of time used to determine if a polite moment has occurred or is about to occur. If activity in the conference has not been detected for the threshold amount of time, then the conference analyzer 128 may determine that a polite moment is occurring. Alternatively, if, based on the speaker's tone and/or voice inflections, the conference analyzer 128 determines that a polite moment is about to occur (e.g., because a question has just been asked or because the speaker has finished a sentence), then the conference analyzer 128 may determine that the beginning of a polite moment has occurred in step 428. The length of pause required to define a polite moment may be automatically configured or user configured. The length of time may vary based on a speaker's accent because certain dialects and/or accents have different natural pauses than other dialects and/or accents. The length of time may also vary based on the language being used. If the conference analyzer 128 determines that a polite moment has just started or is underway, then the method continues to step 420 where the addition of the previously waiting participant to the conference is announced to all conference participants.

In contrast, if the conference analyzer 128 does not determine that a polite moment has occurred, then the waiting participant is forced to continue waiting. This allows the active conference participants to engage in their conversation without being interrupted by the admission and announcement of the new caller. While the waiting participant is held out of the conference, however, one or more active participants (e.g., the conference host) may be provided with a more subtle and less distracting notification that the caller is waiting to join the conference (step 432). This more subtle notification may be provided via the visual display 300 in the status field 308. Alternatively, the host participant may be notified of the existence of a waiting participant via a whisper message sent to the host. Whisper notification may be in the form of a short beep or series of beeps that differ from the beep provided to announce the addition of a new participant to the conference. The whisper notification may be sent via a separate communication channel between the conference analyzer 128 and a selected communication device 108. This way the message that a user is waiting does not have to be sent to all conference participants.

In addition to providing the host with a notification that the new caller is a waiting participant, the waiting participant may be provided with information about their waiting status. For example, an indication as to the amount of time until a default entry will be executed may be provided to the waiting participant. This allows the waiting participant to know, at most, how long they will be waiting to join the conference. After the host and the waiting participant have been apprised as to the status of the waiting participant, the method returns to step 416, where it is determined if a default entry should be executed.

Alternatively, admission need not necessarily be coincident with the polite moment. For example, admission could occur at a first point in time while the announcement is made to the other active conference participants that the new caller (s) has joined the conference at a later point in time, such as during a polite moment. Also, based, for example, on one or more of the participant ID, late time, join time, or at a calling party request, the host could authorize immediate admission regardless of whether there was a polite moment.

Although the present invention has been primarily discussed in the context of voice conferences and the like, one skilled in the art will appreciate that novel aspects of the present invention can be equally applied to other mediums. Examples of such mediums include video conferences, webcasts and other lecture-type conferences, and any other type of real-time conference where a communication device 108 user wishes to join a conversation currently underway between two or more other communication device 108 users.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for allowing a conference call participant to be politely joined to the conference call when the conference call is already under way. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method of facilitating a conference call between two or more participants, comprising:
   determining, by a processor, that a first new caller desires to join an active conference between the two or more participants;
   analyzing, by the processor, interaction between the two or more participants;
   based on the analysis step, determining whether it is polite to allow admittance of the first new caller to the active conference;
   when admittance of the first new caller is determined to be polite, automatically allowing the first new caller to join the active conference without asking the two or more participants for permission; and
   when admittance of the first new caller is determined not to be polite, automatically causing the first new caller to become a first waiting participant to the active conference;
   wherein the determining step further comprises at least one of the following (1) and (2):
   1) timing periods in the conference call where the two or more participants are not active;
       comparing a length of time of at least one inactive period to a predetermined amount of time corresponding to a polite threshold;
       determining that the length of time of the at least one inactive period is at least one of greater than and equal to the predetermined amount of time corresponding to the polite threshold; and
       determining that admittance of the first new caller is polite; and
   2) starting a timer at a point-in-time when it is determined that the first new caller desires to join the conference;
       comparing a value of the timer for the first new caller to a predetermined default entry time;
       determining that the value of the timer for the first new caller at least one of meets and exceeds the predetermined default entry time; and
       determining that admittance of the first new caller is polite.

2. The method of claim 1, wherein the predetermined amount of time corresponding to the polite threshold is based on at least one of (i) a language spoken by the two or more participants; (ii) a dialect of the two or more participants; and (iii) conference permissions of the first new caller.

3. The method of claim 1, further comprising:
   determining that a second new caller desires to join the conference;
   starting a timer at a point-in-time when it is determined that the second new caller desires to join the conference;
   allowing the second new caller to join the conference with the first new caller even though the value of the timer for the second new caller does not at least one of meet and exceed the predetermined default entry time.

4. The method of claim 1, further comprising announcing the admittance of the first new caller to the conference call to the two or more participants.

5. The method of claim 1, further comprising:
   notifying at least one of the two or more participants that the waiting participant desires to join the conference call;
   receiving an indication from at least one of the two or more participants that the waiting participant can join the conference call; and
   determining that admittance of the first new caller is polite.

6. The method of claim 5, wherein the notified at least one of the two or more participants is a host participant.

7. The method of claim 1, further comprising presenting participation status information of the first new caller to at least one of the two or more participants.

8. A non-transitory computer readable medium comprising processor executable instructions operable to perform the method of claim 1.

9. A conferencing system, comprising:
a conference bridge operable to facilitate a conference call between two or more participants; and
a conference analyzer operable to restrict full admittance of a new caller to the conference call until a polite moment in the conference call is detected, wherein the polite moment is determined based on an analysis of interactions between the two or more participants and, when admittance of the new caller is determined to be polite, automatically allowing the new caller to join the conference call without asking the two or more participants for permission;
wherein a polite moment is further determined according to at least one of the following (1) and (2):
1) timing periods in the conference call where the two or more participants are not active;
comparing a length of time of at least one inactive period to a predetermined amount of time corresponding to a polite threshold;
determining that the length of time of the at least one inactive period is at least one of greater than and equal to the predetermined amount of time corresponding to the polite threshold; and
determining that admittance of the first new caller is polite; and
2) starting a timer at a point-in-time when it is determined that the first new caller desires to join the conference;
comparing a value of the timer for the first new caller to a predetermined default entry time;
determining that the value of the timer for the first new caller at least one of meets and exceeds the predetermined default entry time; and
determining that admittance of the first new caller is polite.

10. The system of claim 9, wherein the polite moment is further based on when at least one of the two or more participants indicates that the new caller can be admitted to the conference call.

11. The system of claim 9, wherein the polite moment is detected when the new caller has been waiting to join the conference call for an amount of time at least one of equal to and greater than a predetermined default entry amount of time.

12. The system of claim 9, wherein the polite moment is detected when a lack of participant activity lasting longer than a predetermined amount of time corresponding to a polite threshold is detected in the conference call.

13. The system of claim 12, wherein the predetermined amount of time corresponding to the polite threshold is based on at least one of (i) a language spoken by the two or more participants; (ii) a dialect of the two or more participants; and (iii) conference permissions of the new caller.

14. The system of claim 9, wherein the conference analyzer is further operable to announce an admittance of new callers to the conference call upon admitting the new callers to the conference call.

15. The system of claim 9, wherein the conference analyzer is further operable to notify at least one of the two or more participants that a waiting participant desires to join the conference call, receive an indication from at least one of the two or more participants that the waiting participant can join the conference call, and in response to receiving the indication that the waiting participant can join the conference call, determine that a polite moment has occurred.

16. A communication device, comprising:
a conference analyzer operable to restrict full admittance of a new caller to a conference call between two or more participants until a polite moment in the conference call is detected, wherein the polite moment is determined based on an analysis of interactions between the two or more participants and, when admittance of the new caller is determined to be polite, automatically allowing the new caller to join the conference call without asking the two or more participants for permission;
wherein a polite moment is further determined according to at least one of the following (1) and (2):
1) timing periods in the conference call where the two or more participants are not active;
comparing a length of time of at least one inactive period to a predetermined amount of time corresponding to a polite threshold;
determining that the length of time of the at least one inactive period is at least one of greater than and equal to the predetermined amount of time corresponding to the polite threshold; and
determining that admittance of the first new caller is polite; and
2) starting a timer at a point-in-time when it is determined that the first new caller desires to join the conference;
comparing a value of the timer for the first new caller to a predetermined default entry time;
determining that the value of the timer for the first new caller at least one of meets and exceeds the predetermined default entry time; and
determining that admittance of the first new caller is polite.

17. The device of claim 16, wherein the polite moment is further based on when at least one of the two or more participants indicates that the new caller can be admitted to the conference call.

18. The device of claim 16, wherein the polite moment is detected when the new caller has been waiting to join the conference call for an amount of time at least one of equal to and greater than a predetermined default entry amount of time.

19. The device of claim 16, wherein the polite moment is detected when a lack of participant activity lasting longer than a predetermined amount of time corresponding to a polite threshold is detected in the conference call.

20. The device of claim 19, wherein the predetermined amount of time corresponding to the polite threshold is based on at least one of (i) a language spoken by the two or more participants; (ii) a dialect of the two or more participants; and (iii) conference permissions of the new caller.

21. The device of claim 19, wherein the new caller is allowed to join the conference call prior to an announcement indicating their joining is played.

* * * * *